No. 631,350. Patented Aug. 22, 1899.
F. P. WHITE.
WHEEL HUB.
(Application filed June 8, 1899.)

(No Model.)

Witnesses
Clarence H. Walker
Geo. H. Chandlee

F. P. White. Inventor
By his Attorneys,
C. A. Snow & Co.

UNITED STATES PATENT OFFICE.

FRANKLIN P. WHITE, OF WILMINGTON, NORTH CAROLINA.

WHEEL-HUB.

SPECIFICATION forming part of Letters Patent No. 631,350, dated August 22, 1899.

Application filed June 8, 1899. Serial No. 719,849. (No model.)

*To all whom it may concern:*

Be it known that I, FRANKLIN P. WHITE, a citizen of the United States, residing at Wilmington, in the county of New Hanover and State of North Carolina, have invented a new and useful Wheel-Hub, of which the following is a specification.

This invention relates to wheel-hubs; and it has for its object to provide a construction which may be formed entirely of metal or a combination of metal and other material or materials and in which the parts may be readily adjusted for wear, to secure a tightness at all times, and in which the wearing of the securing-nut will be upon an adjustable portion of the structure.

The invention consists of a hub proper having a longitudinal opening through a portion of its length and which opening is tapered at its outer end and is screw-threaded for the reception of an adjustable box, the outer end of which is in threaded engagement with said threads, and which box is held concentric with the hub through the medium of set-screws passed radially inwardly of a hub adjacent its inner edge. The box is adapted for the reception of the spindle of the axle, upon the outer end of which spindle is applied the securing-nut of usual form, and which nut bears directly upon the ends of the box.

Figure 1:
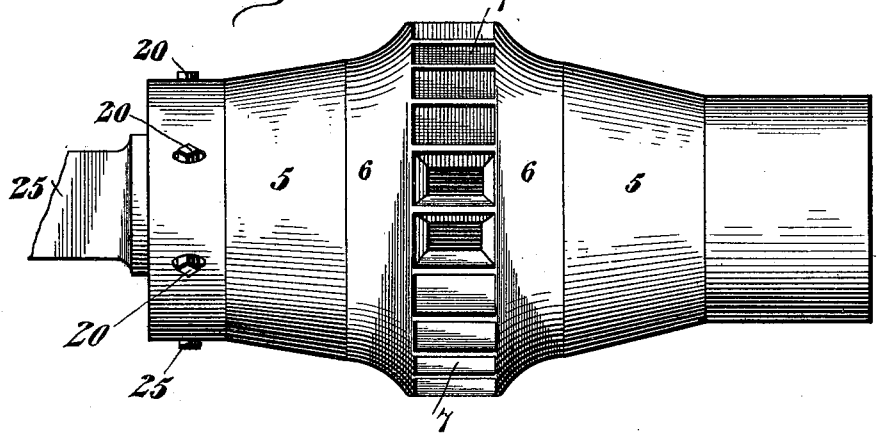
Figure 2:
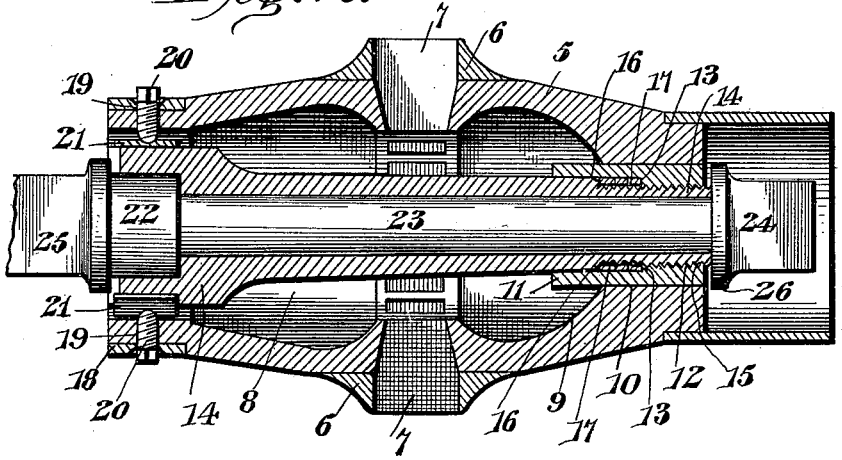

In the drawings forming a portion of the specification, and in which like numerals of reference indicate similar parts in the several views, Figure 1 is a top elevation of a hub and an adjacent portion of an axle having its spindle therein. Fig. 2 is a horizontal section through the axis of the hub, the axle, spindle, and securing-nut being in elevation.

Referring now to the drawings, I have shown a hub comprising wood or other similar material having metal parts connected therewith, although said metal parts may be formed integral with the hub proper, as will be hereinafter explained.

5 represents the hub proper, intermediate the ends of which is arranged the spoke-securing band 6, having radial openings 7, adapted for the reception of spokes in the usual manner, said radial openings opening inwardly into a central longitudinal opening 8, extending from the rear end of the hub outwardly, and the outer end of which is tapered, as shown at 9, and terminates in a diminished cylindrical portion 10. The inner wall of the opening 8 is provided with an annular flange corresponding in form to the band 6 and diametrically opposite thereto. The spoke-openings pass through this flange, and the flange thus acts as a reinforcement. Fixed within the diminished portion 10 is a socket 11, having interior threads extending from the outer end thereof inwardly for substantially half its length, as shown at 12, that portion of the socket in the rear of said threads having its opening increased in diameter, resulting in the formation of a shoulder 13 at the forward end of the enlarged portion of the bore of the socket.

Within the hub 5 and concentric therewith is arranged a box 14, the outer end of which is provided with threads 15, adapted to engage the threads 12, said box being adjustable with respect to the collar 10 to an extent sufficient to project its outer end beyond the outer end of the socket.

The threaded outer end of the box 14 has a diameter corresponding to the minor diameter of the bore of the socket, that portion of the box in the rear of its threads being cylindrical and having a diameter equal to that of the major portion of the bore of the socket, resulting in the formation of a shoulder 16 at the rear of the minor portion. In order to limit the outward movement of the box 14 through the socket, one or more washers 17 of suitable thickness are disposed upon the box and are adapted to fill in between the shoulders 13 and 16.

In order to hold the rear end of the box 14 concentric with the hub proper, I shrink a band 18 upon the rear end of said hub, and through said band and hub is formed a plurality of radial screw-threaded perforations 19, through which are passed set-screws 20, engaging with their inner rounded ends arc-shaped clamping-plates 21, adapted to fit with their concaved sides or faces against the periphery of the enlarged rear end 21 of the box 14. Thus by manipulation of the screws 20 the hub and box may be adjusted to lie concentrically and may be held in this position.

The bore of the box 14 is enlarged at its rear end to receive the annular flange 22 of an axle-spindle 23, passed through said box, said spindle having its outer end threaded for the reception of a securing-nut 24. The inner end of the hub proper is adapted to receive in its opening the adjacent end of the axle 25, as the parts are adjusted. Also at the outer end of the hub is secured an annular flange 26, which projects outwardly therefrom and incloses the nut 24 in the usual manner.

It will be noted upon reference to Fig. 2 of the drawings that I have shown the box 14 projected beyond the socket 11 and with the nut 24 in direct engagement with the outer end of the box. Thus as the hub rotates the wear of the nut will be upon the end of the box instead of upon a part fixed to the hub proper, as in the usual construction. As the projecting portion of the box is worn away it may be further protruded to compensate for said wear, and thus will be maintained at all times a tight fitting of the parts.

As above intimated, I may form the hub proper with its bands 6 and 18, its flange 26, and socket 11 integral, in which event the walls of the hub proper will be of lesser thickness than when made of wood or other similar material.

I have shown the band 18 provided with countersinks around the threaded openings for the set-screws 20, to provide for shortening said screws and enable me to operate a sand-guard around the inner end of the hub and inclosing said set-screws.

It will be readily understood that the parts of my device may be made of any size and proportions and that it may be altered to adapt it for use upon vehicles of any style and for any purpose, and also that in the manufacture of the device I may employ any material that may be desired for any of the parts.

Having thus described the invention, what is claimed is—

1. The combination with a hub having a longitudinal opening provided with a contracted outer end, of threads within said contracted portion fixed with respect to the hub, a bearing-box passed through said opening and engaging said threads and adjustable longitudinally thereof to project the box at one end and draw it into the hub at the opposite end to compensate for wear, and means for holding the box in its adjusted positions.

2. The combination with a hub having a longitudinal opening provided with an internally-screw-threaded bushing in its outer end, of a box within said opening and in engagement with the threaded portion of the bushing and adapted to project beyond the outer end of the hub to receive direct engagement of the retaining-nut, and means for holding said box in its adjusted positions.

3. The combination with a hub having a longitudinal opening, the outer end of which is contracted and provided with an internally-threaded bushing, a bearing-box passed through said opening and in engagement with the threads of the bushing, and means passed radially of the hub and engaging the box to hold it against movement with respect to the hub and concentric therewith.

4. The combination with a hub having a longitudinal opening the outer end of which is provided with a screw-threaded bushing, a bearing-box having a diminished outer end engaging said threads, and a resultant shoulder, means intermediate said shoulder and the adjacent portion of the hub to limit the outward movement of the box, and clamps carried by the hub and adapted to engage the box and hold it against movement.

In testimony that I claim the foregoing as my own I have hereto affixed my signature in the presence of two witnesses.

FRANKLIN P. WHITE.

Witnesses:
J. ROSS COLHOUN,
THEODORE DALTON.